United States Patent
Shimpo et al.

(10) Patent No.: US 10,913,918 B2
(45) Date of Patent: Feb. 9, 2021

(54) REFRIGERATING MACHINE OIL

(71) Applicant: ENEOS Corporation, Tokyo (JP)

(72) Inventors: Hiroko Shimpo, Tokyo (JP); Kentaro Yamaguchi, Tokyo (JP); Hidetoshi Ogata, Tokyo (JP); Takeshi Okido, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/092,630

(22) PCT Filed: Apr. 14, 2017

(86) PCT No.: PCT/JP2017/015255
§ 371 (c)(1),
(2) Date: Oct. 10, 2018

(87) PCT Pub. No.: WO2017/179687
PCT Pub. Date: Oct. 19, 2017

(65) Prior Publication Data
US 2019/0127659 A1    May 2, 2019

(30) Foreign Application Priority Data

Apr. 14, 2016 (JP) .................. 2016-081259

(51) Int. Cl.
*C09K 5/04* (2006.01)
*C10M 169/04* (2006.01)
(Continued)

(52) U.S. Cl.
CPC ......... *C10M 169/041* (2013.01); *C09K 5/045* (2013.01); *C10M 105/38* (2013.01);
(Continued)

(58) Field of Classification Search
CPC .......... C10M 107/28; C10M 2209/084; C10M 169/041; C10M 145/14
See application file for complete search history.

(56) References Cited

U.S. PATENT DOCUMENTS 5,017,300 A * 5/1991 Raynolds ............... C09K 5/045
                                                   252/67
5,798,054 A   8/1998 Takehisa et al.
(Continued)

FOREIGN PATENT DOCUMENTS

EP    1047747    11/2000
EP    2829954    1/2015
(Continued)

OTHER PUBLICATIONS

International Search Report issued in International Patent Application No. PCT/JP2017/015255, dated May 30, 2017.
(Continued)

*Primary Examiner* — John R Hardee
(74) *Attorney, Agent, or Firm* — Greenblum & Bernstein, P.L.C.

(57) ABSTRACT

The present invention provides a refrigerating machine oil comprising:
a lubricating base oil; and
40 mass % or less of a polymer, based on a total amount of the refrigerating machine oil, the polymer having a structural unit represented by the following formula (I) and a weight average molecular weight of from 500 to 100000.
(Continued)

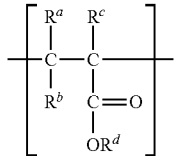

(I)

[In formula (I), $R^a$, $R^b$ and $R^c$ each independently represents a hydrogen atom or a hydrocarbon group, and $R^d$ represents an oxygen-containing organic group or a $C_{1-18}$ hydrocarbon group.]

7 Claims, 2 Drawing Sheets (51) Int. Cl.
- *C10M 145/14* (2006.01)
- *C10M 171/00* (2006.01)
- *C10M 105/38* (2006.01)
- *C10M 107/24* (2006.01)
- *C10N 20/04* (2006.01)
- *C10N 20/00* (2006.01)
- *C10N 30/06* (2006.01)
- *C10N 40/30* (2006.01)

(52) U.S. Cl.
CPC ........ *C10M 107/24* (2013.01); *C10M 145/14* (2013.01); *C10M 171/008* (2013.01); *C09K 2205/106* (2013.01); *C09K 2205/12* (2013.01); *C09K 2205/122* (2013.01); *C09K 2205/126* (2013.01); *C10M 2207/0406* (2013.01); *C10M 2207/2825* (2013.01); *C10M 2207/2835* (2013.01); *C10M 2209/043* (2013.01); *C10M 2209/084* (2013.01); *C10N 2020/04* (2013.01); *C10N 2020/097* (2020.05); *C10N 2030/06* (2013.01); *C10N 2040/30* (2013.01)

(56) References Cited

U.S. PATENT DOCUMENTS

| | | |
|---|---|---|
| 6,299,792 B1 | 10/2001 | Feiring et al. |
| 2007/0037715 A1 | 2/2007 | Tahei |
| 2010/0032610 A1* | 2/2010 | Nappa ................. A62D 1/0057 252/67 |
| 2011/0006248 A1* | 1/2011 | Van Horn .............. C09K 5/045 252/68 |
| 2012/0223269 A1* | 9/2012 | Van Horn .......... C10M 171/008 252/68 |
| 2015/0299604 A1 | 10/2015 | Takata |
| 2016/0053196 A1 | 2/2016 | Tagawa et al. |
| 2016/0244692 A1 | 8/2016 | Takahashi et al. |

FOREIGN PATENT DOCUMENTS

| | | |
|---|---|---|
| JP | 62-059695 | 3/1987 |
| JP | 5-320680 | 12/1993 |
| JP | 2002-509179 | 3/2002 |
| JP | 2007-204568 | 8/2007 |
| JP | 2009-179694 | 8/2009 |
| JP | 2013-257121 | 12/2013 |
| WO | 99/036485 | 7/1999 |
| WO | 01/083619 | 11/2001 |
| WO | 2009/108547 | 9/2009 |
| WO | 2013/089143 | 6/2013 |
| WO | 2014/157383 | 10/2014 |
| WO | 2015/050120 | 4/2015 |
| WO | 2015/178233 | 11/2015 |
| WO | 2017/057613 | 4/2017 |
| WO | 2017/057614 | 4/2017 |

OTHER PUBLICATIONS

International Preliminary Report on Patentability issued in International Patent Application No. PCT/JP2017/015255, dated Oct. 25, 2018.

European Search Report issued in counterpart European Patent Application No. 17782500.7 dated Dec. 11, 2018.

* cited by examiner

REFRIGERATING MACHINE OIL

TECHNICAL FIELD

The present invention relates to a refrigerating machine oil.

BACKGROUND ART

A refrigerating machine such as a refrigerator, an automotive air conditioner, a room air conditioner, or a vending machine is provided with a compressor for circulation of a refrigerant within the refrigeration cycle. The compressor is filled with a refrigerating machine oil for lubrication of slide members. The refrigerating machine oil is required to have various properties in addition to lubricity such as antiwear property.

One of properties required for a refrigerating machine oil is oil return performance, for example. As described in patent literature 1, a decrease in the amount of oil return may result in worn slide members of the compressor, for example.

CITATION LIST

Patent Literature

Patent Literature 1: Japanese Unexamined Patent Publication No. 2013-257121

SUMMARY OF INVENTION

Technical Problem

An object of the present invention is to provide a refrigerating machine oil excellent in lubricity (particularly, antiwear property) and oil return performance.

Solution to Problem

The present invention provides, in an aspect, a refrigerating machine oil comprising: a lubricating base oil; and 40 mass % or less of a polymer, based on the total amount of the refrigerating machine oil, the polymer having a structural unit represented by the following formula (I) and a weight average molecular weight of from 500 to 100000.

(I)

[In formula (I), $R^a$, $R^b$ and $R^c$ each independently represents a hydrogen atom or a hydrocarbon group, and $R^d$ represents an oxygen-containing organic group or a $C_{1-18}$ hydrocarbon group.]

The lubricating base oil comprises at least one oxygen-containing oil selected from preferably, ester and ether. An example of the ester is preferably an ester of polyhydric alcohol and carboxylic acid. The above refrigerating machine oil is preferably used together with at least one refrigerant selected from a saturated fluorohydrocarbon refrigerant, an unsaturated fluorohydrocarbon refrigerant, a hydrocarbon refrigerant and a natural refrigerant.

The present invention provides, in another aspect, a working fluid composition for a refrigerating machine comprising a refrigerant and the above refrigerating machine oil. The refrigerant is preferably at least one refrigerant selected from a saturated fluorohydrocarbon refrigerant, an unsaturated fluorohydrocarbon refrigerant, a hydrocarbon refrigerant and a natural refrigerant.

The present invention provides, in another aspect, a refrigerating machine comprising the above refrigerating machine oil, or a refrigerating machine comprising the above working fluid composition for a refrigerating machine.

Advantageous Effects of Invention

According to the present invention, a refrigerating machine oil and a working fluid composition for a refrigerating machine, which are excellent in lubricity (particularly, antiwear property) and oil return performance, can be provided.

DESCRIPTION OF EMBODIMENTS

The refrigerating machine oil according to the embodiment comprises a lubricating base oil and a polymer (hereafter, may also be referred to as "acrylate polymer") having a structural unit represented by the following formula (I) and a weight average molecular weight of from 500 to 100000.

[In formula (I), $R^a$, $R^b$ and $R^c$ each independently represents a hydrogen atom or a hydrocarbon group, and $R^d$ represents an oxygen-containing organic group or a $C_{1-18}$ hydrocarbon group.]

As the lubricating base oil, a hydrocarbon oil, an oxygen-containing oil or the like can be used. Examples of the hydrocarbon oil include a mineral oil-based hydrocarbon oil, and a synthetic hydrocarbon oil. Examples of the oxygen-containing oil include ester, ether, carbonate, ketone, silicone, and polysiloxane.

The mineral oil-based hydrocarbon oil can be obtained by refining a lubricating oil distillate obtained by atmospheric distillation and vacuum distillation of paraffinic crude oil, naphthenic crude oil or the like, by a method such as solvent deasphalting, solvent refining, hydrogenation refining, hydrocracking, solvent dewaxing, hydrodewaxing, clay treatment, or sulfuric acid treatment. One of these refining methods may be employed independently or two or more of the same may be employed in combination.

Examples of the synthetic hydrocarbon oil include an alkylbenzene, an alkylnaphthalene, a polyα-olefin (PAO), a polybutene, and an ethylene-α-olefin copolymer.

As the alkylbenzene, for example, linear or branched alkylbenzene having one to four, and preferably one or two $C_{1-40}$, preferably $C_{1-19}$ linear or branched alkyl groups can be used.

Polyα-olefin (PAO) is a compound obtained by polymerizing several molecules of $C_{6-18}$ linear olefin having a double bond at only one of the ends, followed by hydrogenation. The polyα-olefin may be isoparaffin having a molecular weight distribution mainly composed of trimers or tetramers of $C_{10}$ α-decene or $C_{12}$ α-dodecene, for example.

Examples of esters include an aromatic ester, a dibasic acid ester, a polyol ester, a complex ester, a carbonic ester and mixtures thereof. The ester is preferably a polyol ester or a complex ester. Esters preferably contain a polyol ester as a major ingredient. The proportion of a polyol ester in the esters may be 50 mass % or more, 60 mass % or more, 70 mass % or more, 80 mass % or more, or 90 mass % or more, for example. In addition, esters as a lubricating base oil do not contain the above acrylate polymer.

Polyol ester is an ester of polyhydric alcohol and carboxylic acid. As the carboxylic acid, monovalent or polyvalent carboxylic acid can be used, and aliphatic carboxylic acid is preferred. As fatty acid that is monovalent aliphatic carboxylic acid, saturated fatty acid is preferably used. Number of carbon atoms in the fatty acid ranges from preferably 4 to 20, more preferably 4 to 18, further preferably 4 to 9, and particularly preferably 5 to 9. Polyol ester may be a partial ester in which a portion of the hydroxyl groups of polyhydric alcohol remains in the form of hydroxyl groups: that is, remains unesterified, may be a full ester in which all hydroxyl groups are esterified, or may be a mixture of a partial ester and a full ester. The hydroxyl value of the polyol ester is preferably 10 mg KOH/g or less, more preferably 5 mg KOH/g or less, further preferably 3 mg KOH/g or less. The hydroxy value in the present invention refers to a hydroxyl value measured in accordance with JIS K0070: 1992.

Of the carboxylic acids constituting the polyol ester, the proportion of $C_{4-20}$ fatty acid ranges from preferably 20 to 100 mol %, more preferably 50 to 100 mol %, further preferably 70 to 100 mol %, and particularly preferably 90 to 100 mol %.

Specific examples of $C_{4-20}$ fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These fatty acids may be linear or branched. The fatty acids are branched preferably at position α and/or β, and are more preferably selected from 2-methylpropanoic acid, 2-methylbutanoic acid, 2-methylpentanoic acid, 2-methyihexanoic acid, 2-ethylpentanoic acid, 2-methylheptanoic acid, 2-ethylhexanoic acid, 3,5,5-trimethylhexanoic acid and 2-ethylhexadecanoic acid, and further preferably selected from 2-ethylhexanoic acid and 3,5,5-trimethylhexanoic acid.

The fatty acids may include fatty acids other than $C_{4-20}$ fatty acids. Fatty acids other than $C_{4-20}$ fatty acids may be $C_{21-24}$ fatty acids, for example. $C_{21-24}$ fatty acids may be heneicosanoic acid, docosanoic acid, tricosanoic acid, tetracosanoic acid, and the like, and may be linear or branched.

As a polyhydric alcohol constituting the polyol ester, a polyhydric alcohol having 2 to 6 hydroxy groups is preferably used. The number of carbon atoms of the polyhydric alcohol ranges from preferably 4 to 12, and more preferably 5 to 10. The polyhydric alcohol is hindered alcohol such as preferably, neopentyl glycol, trimethylolethane, trimethylolpropane, trimethylolbutane, di-(trimethylolpropane), tri-(trimethylolpropane), pentaerythritol, and dipentaerythritol. The polyhydric alcohol is more preferably pentaerythritol, dipentaerythritol, or a mixed alcohol of pentaerythritol and dipentaerythritol, since this is particularly excellent in compatibility with a refrigerant and hydrolytic stability.

The complex ester is an ester synthesized from, preferably, at least one selected from polyhydric alcohols having 2 to 4 hydroxyl groups, at least one selected from $C_{6-12}$ polybasic acids, and at least one selected from $C_{4-18}$ monohydric alcohols and $C_{2-12}$ monovalent fatty acids.

Examples of the polyhydric alcohol having 2 to 4 hydroxyl groups include neopentyl glycol, trimethylolpropane, and pentaerythritol.

In view of excellent lubricity, the polyhydric alcohols constituting a complex ester further contRins, preferably, in addition to polyhydric alcohols having 2 to 4 hydroxyl groups, $C_{2-10}$ dihydric alcohols other than neopentyl glycol. Examples of the $C_{2-10}$ dihydric alcohols other than neopentyl glycol include ethylene glycol, propanediol, butanediol, pentanediol, hexanediol, 2-methyl-1,3-propanediol, 3-methyl-1,5-pentanediol, and 2,2-diethyl-1,3-pentanediol.

Examples of the $C_{6-12}$ polybasic acid include adipic acid, pimelic acid, suberic acid, azelaic acid, sebacic acid, phthalic acid, and trimellitic acid.

Examples of the $C_{4-18}$ monohydric alcohols include aliphatic alcohols such as butanol, pentanol, hexanol, heptanol, octanol, nonanol, decanol, dodecanol, and oleyl alcohol. These monohydric alcohols may be linear or branched.

Examples of the $C_{2-12}$ monovalent fatty acid include ethanoic acid, propanoic acid, butanoic acid, pentanoic acid, hexanoic acid, heptanoic acid, octanoic acid, nonanoic acid, decanoic acid, and dodecanoic acid. These monovalent fatty acids may be linear or branched.

Examples of the ether include a polyvinyl ether, a polyalkylene glycol, a polyphenylether, a perfluoro ether and mixtures thereof. The ether is selected from preferably polyvinyl ether and polyalkylene glycol, and is more preferably polyvinyl ether.

The polyvinyl ether has a structural unit represented by the following formula (1).

(1)

[In formula (1), $R^1$, $R^2$ and $R^3$ may be the same or different from each other, and each represents a hydrogen atom or a hydrocarbon group, $R^4$ represents a divalent hydrocarbon group or a divalent ether bond oxygen-containing hydrocarbon group, $R^5$ represents a hydrocarbon group, and m represents an integer of 0 or greater. When m is 2 or greater, a plurality of $R^4$ may be the same or different from each other.]

The number of carbon atoms of hydrocarbon groups represented by $R^1$, $R^2$ and $R^3$ is preferably 1 or more, more preferably 2 or more, and further preferably 3 or more, and is preferably 8 or less, more preferably 7 or less, and further preferably 6 or less. At least one of $R^1$, $R^2$ and $R^3$ is preferably a hydrogen atom, and all of $R^1$, $R^2$ and $R^3$ are more preferably hydrogen atoms.

The number of carbon atoms of the divalent hydrocarbon group and the ether bond oxygen-containing hydrocarbon group represented by $R^4$ is preferably 1 or more, more preferably 2 or more, and further preferably 3 or more, and is preferably 10 or less, more preferably 8 or less, and further preferably 6 or less. The divalent ether bond oxygen-containing hydrocarbon group represented by $R^4$ may be a hydrocarbon group having oxygen constituting an ether bond in its side chain, for example.

$R^5$ is preferably a $C_{1-20}$ hydrocarbon group. Examples of the hydrocarbon group include an alkyl group, a cycloalkyl group, a phenyl group, an aryl group, and an aryl alkyl group. The hydrocarbon group is preferably an alkyl group, and is more preferably a $C_{1-5}$ alkyl group.

Integer "m" is preferably 0 or greater, more preferably 1 or greater, and further preferably 2 or greater, and is preferably 20 or lower, more preferably 18 or lower, and further preferably 16 or lower. The average value of "m" of all structural units constituting the polyvinyl ether ranges from preferably 0 to 10.

The polyvinyl ether may be a homopolymer composed of one structural unit selected from the structural units represented by formula (1), a copolymer composed of two or more structural units selected from the structural units represented by formula (1), or a copolymer composed of the structural units represented by formula (1) and other structural units. The polyvinyl ether that is a copolymer can further improve lubricity, insulation property, hygroscopicity and the like, while satisfying the compatibility with a refrigerant in the refrigerating machine oil. At this time, through appropriate selection of the types of monomers to be used as raw materials, initiator types, the proportion of structural units in the copolymer, and the like, various properties of the above refrigerating machine oil can be obtained as desired. The copolymer may be a block copolymer or a random copolymer.

When the polyvinyl ether is a copolymer, the copolymer preferably has a structural unit (1-1) represented by the above formula (1) in which $R^5$ is a $C_{1-3}$ alkyl group, and a structural unit (1-2) represented by the above formula (1) in which $R^5$ is a $C_{3-20}$, preferably $C_{3-10}$, and further preferably $C_{3-8}$ alkyl group. $R^5$ in the structural unit (1-1) is particularly preferably an ethyl group, and $R^5$ in the structural unit (1-2) is particularly preferably an isobutyl group. When the polyvinyl ether is a copolymer having the above structural units (1-1) and (1-2), the molar ratio of the structural unit (1-1) to the structural unit (1-2) ranges from preferably 5:95 to 95:5, more preferably 20:80 to 90:10, and further preferably 70:30 to 90:10. The molar ratio within the above range tends to enable further improvement in the compatibility with a refrigerant and a decrease in hygroscopicity.

The polyvinyl ether may be composed of only structural units represented by the above formula (1), or a copolymer further having structural units represented by the following formula (2). In this case, the copolymer may be a block copolymer or a random copolymer.

(2)

[In formula (2), $R^6$ to $R^9$ may be the same or different from each other, and each represents a hydrogen atom or a $C_{1-20}$ hydrocarbon group.]

The polyvinyl ether can be produced by polymerization of vinyl ether-based monomers corresponding to structural units represented by formula (1), or, by copolymerization of vinyl ether-based monomers corresponding to structural units represented by formula (1) and hydrocarbon monomers having olefinic double bonds corresponding to structural units represented by formula (2). As the vinyl ether-based monomers corresponding to structural units represented by formula (1), monomers represented by the following formula (3) are suitable.

(3)

[In formula (3), $R^1$, $R^2$, $R^3$, $R^4$, $R^5$ and m each represents the same as defined for $R^1$, $R^2$, $R^3$, $R^4$, $R^5$ and m in formula (1).]

The polyvinyl ether has preferably the following terminal structure (A) or (B).

In the structure (A), one end is represented by formula (4) or (5), and the other end is represented by formula (6) or (7).

(4)

[In formula (4), $R^{11}$, $R^{21}$ and $R^{31}$ may be the same or different from each other, and each represents a hydrogen atom or a $C_{1-8}$ hydrocarbon group, $R^{41}$ represents a $C_{1-10}$ divalent hydrocarbon group or divalent ether bond oxygen-containing hydrocarbon group, $R^{51}$ represents a $C_{1-20}$ hydrocarbon group, and m represents the same as defined for "m" in formula (1). When m is 2 or greater, a plurality of $R^{41}$ may be the same or different from each other.]

(5)

[In formula (5), $R^{61}$, $R^{71}$, $R^{81}$ and $R^{91}$ may be the same or different from each other, and each represents a hydrogen atom or a $C_{1-20}$ hydrocarbon group.]

(6)

[In formula (6), $R^{12}$, $R^{22}$ and $R^{32}$ may be the same or different from each other, and each represents a hydrogen atom or a $C_{1-8}$ hydrocarbon group, $R^{42}$ represents a $C_{1-10}$ divalent hydrocarbon group or divalent ether bond oxygen-containing hydrocarbon group, $R^{52}$ represents a $C_{1-20}$ hydrocarbon group, and m represents the same as defined for "m" in formula (1). When m is 2 or greater, a plurality of $R^{41}$ may be the same or different.]

(7)

[In formula (7), $R^{62}$, $R^{72}$, $R^{82}$ and $R^{92}$ may be the same or different from each other, and each represents a hydrogen atom or a $C_{1-20}$ hydrocarbon group.]

In the structure (B), one end is represented by the above formula (4) or (5), and the other end is represented by the following formula (8).

(8)

[In formula (8), $R^{13}$, $R^{23}$ and $R^{33}$ may be the same or different from each other, and each represents a hydrogen atom or a $C_{1-8}$ hydrocarbon group.]

Of these polyvinyl ethers, the following polyvinyl ethers (a), (b), (c), (d) and (e) are particularly suitable as base oils:
(a) a polyvinyl ether having a structure, in which one end is represented by formula (4) or (5) and the other end is represented by formula (6) or (7), wherein in formula (1), $R^1$, $R^2$ and $R^3$ are all hydrogen atoms, m is an integer between 0 and 4, $R^4$ is a $C_{2-4}$ divalent hydrocarbon group, and $R^5$ is a $C_{1-20}$ hydrocarbon group;
(b) a polyvinyl ether having only structural units represented by formula (1) and a structure in which one end is represented by formula (4), and the other end is represented by formula (6), wherein in formula (1), $R^1$, $R^2$ and $R^3$ are all hydrogen atoms, m is an integer between 0 and 4, $R^4$ is a $C_{2-4}$ divalent hydrocarbon group, and $R^5$ is a $C_{1-20}$ hydrocarbon group;
(c) a polyvinyl ether having a structure in which one end is represented by formula (4) or (5), and the other end is represented by formula (8), wherein in formula (1), $R^1$, $R^2$ and $R^3$ are all hydrogen atoms, m is an integer between 0 and 4, $R^4$ is a $C_{2-4}$ divalent hydrocarbon group, and $R^5$ is a $C_{1-20}$ hydrocarbon group;
(d) a polyvinyl ether having only structural units represented by formula (1) and has a structure in which one end is represented by formula (5), and the other end is represented by formula (8), wherein in formula (1), $R^1$, $R^2$ and $R^3$ are all hydrogen atoms, m is an integer between 0 and 4, $R^4$ is a $C_{2-4}$ divalent hydrocarbon group, and $R^5$ is a $C_{1-20}$ hydrocarbon group; and
(e) any one of the above polyvinyl ethers (a), (b), (c) and (d) having a structural unit in which $R^5$ is a $C_{1-3}$ hydrocarbon group in formula (1) and a structural unit in which the $R^5$ is a $C_{3-20}$ hydrocarbon group.

The weight average molecular weight of the polyvinyl ether is preferably 500 or more, and more preferably 600 or more, and, preferably 3000 or less, more preferably 2000 or less, and further preferably 1500 or less. The polyvinyl ether having a weight average molecular weight of 500 or more is excellent in lubricity under the coexistence of the same and a refrigerant. The polyvinyl ether having a weight average molecular weight of 3000 or less leads to a wider range of the composition exerting compatibility with a refrigerant under low temperature conditions, so as to be able to avoid lubrication failure of a refrigerant compressor or to suppress the inhibition of heat exchange in an evaporator.

The polyvinyl ether has a number average molecular weight of preferably 500 or more, and more preferably 600 or more, and, preferably 3000 or less, more preferably 2000 or less, and further preferably 1500 or less. The polyvinyl ether having a number average molecular weight of 500 or more is excellent in lubricity under the coexistence of the same and a refrigerant. The polyvinyl ether having a number average molecular weight of 3000 or less, leads to a wider range of the composition exerting compatibility with a refrigerant under low temperature conditions, so as to be able to avoid lubrication failure of a refrigerant compressor or to suppress the inhibition of heat exchange in an evaporator.

The weight average molecular weight and the number average molecular weight of a polyvinyl ether refer to a weight average molecular weight and a number average molecular weight (polystyrene (standard sample) equivalent), respectively, as obtained by GPC analysis. Such a weight average molecular weight and a number average molecular weight can be measured as follows, for example.

A solution having a polyvinyl ether concentration of 1 mass % is prepared by dilution using chloroform as a solvent. The solution is analyzed using a GPC apparatus (Waters Alliance2695). Analysis is carried out using a flow rate of the solvent of 1 ml/min, a column with an analyzable molecular weight ranging from 100 to 10000, and a refractive index detector. Note that, the relationship between the column retention time and the molecular weight is obtained using polystyrene with a known molecular weight as a standard to separately prepare a calibration curve in advance. Based on the calibration curve, the molecular weight of a sample is determined from the obtained retention time.

The polyvinyl ether has a degree of unsaturation of preferably 0.04 meq/g or less, more preferably 0.03 meq/g or less, and further preferably 0.02 meq/g or less. The polyvinyl ether has a peroxide value of preferably 10.0 meq/kg or less, more preferably 5.0 meq/kg or less, and further preferably 1.0 meq/kg or less. The polyvinyl ether has a carbonyl value of preferably 100 ppm by weight or less, more preferably 50 ppm by weight or less, and further preferably 20 ppm by weight or less. The polyvinyl ether has a hydroxyl value of preferably 10 mg KOH/g or less, more preferably 5 mg KOH/g or less, and further preferably 3 mg KOH/g or less.

In the present invention, the degree of unsaturation, a peroxide value and a carbonyl value respectively refer to values measured according to the standard methods for the analysis of fats, oils and related materials established by the Japan Oil Chemists' Society. Specifically, the degree of unsaturation in the present invention is found by reacting a sample with a Wijs solution (ICl-acetic acid solution), leaving the reaction mixture to stand in a dark place, subsequently reducing the excess ICl to iodine, titrating the iodine portion with sodium thiosulfate to calculate the iodine value, and then converting the iodine value to vinyl equivalents (meq/g). The peroxide value in the present invention is a value (meq/kg) obtained by adding potassium iodide to a sample, titrating the produced free iodine with sodium thiosulfate, and converting the free iodine to milliequivalents with respect to 1 kg of the sample. The carbonyl value in the present invention is a value (ppm by weight) obtained by allowing 2,4-dinitrophenylhydrazine to act on a sample to produce chromogenic quinoid ions, measuring the absorbance of this sample at 480 nm, and converting it to a carbonyl content based on a predetermined calibration curve found with cinnamaldehyde as the standard substance.

Examples of the polyalkylene glycol include, polyethylene glycol, polypropyleneglycol, and polybutylene glycol. The polyalkylene glycol has oxyethylene, oxypropylene, oxybutylene and the like as structural units. The polyalkylene glycol having these structural units can be obtained by ring-opening polymerization of monomers including ethylene oxide, propylene oxide, and butylene oxide as raw materials.

Examples of the polyalkylene glycol include compounds represented by the following formula (9).

$$R^\alpha-[(OR^\beta)_f-OR^\gamma]_g \qquad (9)$$

[In formula (9), $R^\alpha$ represents a hydrogen atom, a $C_{1-10}$ alkyl group, a $C_{2-10}$ acyl group or a residue of a compound having 2 to 8 hydroxy groups, $R^\beta$ represents a $C_{2-4}$ alkylene group, $R^\gamma$ represents a hydrogen atom, a $C_{1-10}$ alkyl group or a $C_{2-10}$ acyl group, f represents an integer between 1 and 80, and g represents an integer between 1 and 8.]

Alkyl groups represented by $R^\alpha$ and $R^\gamma$ may be linear, branched, or cyclic. The number of carbon atoms of the alkyl group ranges from preferably 1 to 10, and more preferably 1 to 6. The alkyl group having a carbon number of greater than 10 tends to result in lowered compatibility with a refrigerant.

The alkyl group portions of the acyl groups represented by $R^\alpha$ and $R^\gamma$ may be linear, branched, or cyclic. The number of carbon atoms of the acyl group ranges from preferably 2 to 10, and more preferably 2 to 6. The acyl group having a carbon number of greater than 10 may lower the compatibility with a refrigerant to cause phase separation.

When groups represented by $R^\alpha$ and $R^\gamma$ are both alkyl groups, or are both acyl groups, groups represented by $R^\alpha$ and $R^\gamma$ may be the same or different. When g is 2 or greater, a plurality of groups represented by $R^\alpha$ and $R^\gamma$ in the same molecule may be the same or different.

When a group represented by $R^\alpha$ is a residue of a compound having 2 to 8 hydroxy groups, the compound may be linear or cyclic.

Polyalkylene glycol has a weight average molecular weight of preferably 500 or more, and more preferably 600 or more, and preferably 3000 or less, more preferably 2000 or less, and further preferably 1500 or less. Polyalkylene glycol having a weight average molecular weight of 500 or more is excellent in lubricity under the coexistence of the same and a refrigerant. Polyalkylene glycol having a weight average molecular weight of 3000 or less leads to a wider range of the composition exerting compatibility with a refrigerant under low temperature conditions, so as to be able to avoid lubrication failure of a refrigerant compressor or to suppress the inhibition of heat exchange in an evaporator.

Polyalkylene glycol has a number average molecular weight of preferably 500 or more, and more preferably 600 or more, and, preferably 3000 or less, more preferably 2000 or less, and further preferably 1500 or less. Polyalkylene glycol having a number average molecular weight of 500 or more is excellent in lubricity under the coexistence of the same and a refrigerant. Polyalkylene glycol having a number average molecular weight of 3000 or less leads to a wider range of the composition exerting compatibility with a refrigerant under low temperature conditions, so as to be able to avoid lubrication failure of a refrigerant compressor or to suppress the inhibition of heat exchange in an evaporator.

The weight average molecular weight and the number average molecular weight of polyalkylene glycol refer to a weight average molecular weight and a number average molecular weight (polypropyleneglycol (standard sample) equivalent) as obtained by GPC analysis, respectively. Such a weight average molecular weight and a number average molecular weight can be measured as follows, for example.

A solution having a polyalkylene glycol concentration of 1 mass % is prepared by dilution using chloroform as a solvent. The solution is analyzed using a GPC apparatus (Waters Alliance2695). Analysis is carried out using a flow rate of the solvent of 1 ml/min, a column with an analyzable molecular weight ranging from 100 to 10000, and a refractive index detector. Note that, the relationship between the column retention time and the molecular weight is obtained using polyalkylene glycol with a known molecular weight as a standard to separately prepare a calibration curve in advance. Based on the calibration curve, the molecular weight of a sample is determined from the obtained retention time.

The kinematic viscosity at 40° C. of the lubricating base oil is preferably 3 mm$^2$/s or more, more preferably 4 mm$^2$/s or more, and further preferably 5 mm$^2$/s or more. The kinematic viscosity at 40° C. of the lubricating base oil may be preferably 1000 mm$^2$/s or less, more preferably 500 mm$^2$/s or less, and further preferably 400 mm$^2$/s or less. The kinematic viscosity at 40° C. of the lubricating base oil ranges from preferably 25 to 125 mm$^2$/s, and particularly preferably 50 to 75 mm$^2$/s. The kinematic viscosity at 100° C. of the lubricating base oil may be preferably 1 mm$^2$/s or more, and more preferably 2 mm$^2$/s or more. The kinematic viscosity at 100° C. of the lubricating base oil may be preferably 100 mm$^2$/s or less, and more preferably 50 mm$^2$/s or less. The kinematic viscosity in the present invention refers to kinematic viscosity measured in accordance with JIS K2283:2000.

The content of the lubricating base oil may be, based on the total amount of the refrigerating machine oil, 50 mass % or more, 60 mass % or more, 70 mass % or more, 80 mass % or more, or 90 mass % or more.

An acrylate polymer has a structural unit represented by the following formula (I).

[In formula (I), $R^a$, $R^b$ and $R^c$ each independently represents a hydrogen atom or a hydrocarbon group, $R^d$ represents an oxygen-containing organic group or $C_{1-18}$ hydrocarbon group.]

The number of carbon atoms of each of hydrocarbon groups represented by $R^a$, $R^b$ and $R^c$ ranges from preferably 1 to 8, more preferably 1 to 5, and further preferably 1 to 3. Hydrocarbon groups represented by $R^a$, $R^b$ and $R^e$ are preferably alkyl groups. $R^a$ and $R^b$ are preferably hydrogen atoms, and $R^c$ is preferably a hydrogen atom or a methyl group.

Examples of the oxygen-containing organic group represented by $R^d$ include a linear or branched hydrocarbon group containing an ether-bond-constituting oxygen atom, and a hydrocarbon group having a glycidyl group. The number of carbon atoms of the hydrocarbon group represented by $R^d$ ranges from, in view of good oil return performance, preferably 1 to 18, 1 to 15, 1 to 12, 1 to 10, 1 to 8, 1 to 6, or 1 to 5. The average number of carbon atoms of hydrocarbon groups represented by $R^d$ in all structural units constituting an acrylate polymer ranges from, preferably, 1 to 18, 1 to 15, 1 to 12, 1 to 10, or 1 to 5. The hydrocarbon groups represented by $R^d$ may be alkyl groups, cycloalkyl groups, phenyl groups, aryl groups, arylalkyl groups, and the like, and are preferably alkyl groups.

—$OR^d$ in formula (I) is represented by preferably the following formula (II).

—$O(R^eO)_nR^f$ (II)

[In formula (II), $R^e$ represents a divalent hydrocarbon group or a divalent ether bond oxygen-containing hydrocarbon group, $R^f$ represents a hydrocarbon group, and n represents an integer of 0 or greater. When n is 2 or greater, a plurality of $R^e$ may be the same or different from each other.]

The number of carbon atoms of the divalent hydrocarbon group or the ether bond oxygen-containing hydrocarbon group represented by $R^e$ ranges from preferably 1 to 10, more preferably 1 to 5, and further preferably 1 to 3. The divalent ether bond oxygen-containing hydrocarbon group represented by $R^e$ may be a hydrocarbon group having an ether-bond-constituting oxygen atom in a side chain, for example.

$R^f$ is preferably a $C_{1-20}$ hydrocarbon group. A hydrocarbon group represented by $R^f$ may be an alkyl group, a cycloalkyl group, a phenyl group, an aryl group, an arylalkyl group or the like, is preferably an alkyl group, and is more preferably a $C_{1-5}$ alkyl group.

The "n" is an integer of preferably 0 or greater, more preferably 1 or greater, and is an integer of preferably 20 or lower, more preferably 10 or lower, and further preferably 5 or lower. The average value of n in all structural units constituting an acrylate polymer ranges from preferably 0 to 10.

The acrylate polymer may be a homopolymer composed of one structural unit selected from structural units represented by formula (I), a copolymer composed of two or more structural unit selected from structural units represented by formula (1), or a copolymer composed of structural units represented by formula (1) and other structural units. If the acrylate polymer is such a copolymer, lubricity, insulation property, hygroscopicity and the like can further be improved. The content of structural units represented by formula (I) may be, based on the total amount of structural units constituting the acrylate polymer, preferably 50 mol % or more, more preferably 70 mol % or more, further preferably 80 mol % or more, particularly preferably 90 mol % or more, and 100 mol %.

When the acrylate polymer is a copolymer, the copolymer has preferably at least one structural unit selected from structural units wherein $R^d$ in formula (I) is preferably a $C_{14}$ alkyl group. The copolymer may have two or more structural unit selected from structural unit wherein $R^d$ in formula (I) is a $C_{14}$ alkyl group, one or more structural units selected from structural units wherein $R^d$ in formula (I) is a $C_{14}$ alkyl group, and one or more structural unit selected from structural units wherein $R^d$ in formula (I) is an oxygen-containing organic group or a $C_{5-8}$ alkyl group. The content of the structural units wherein $R^d$ in formula (I) is a $C_{14}$ alkyl group is, based on the total amount of structural units constituting the copolymer, preferably 50 mol % or more, more preferably 70 mol % or more, further preferably 80 mol % or more, and particularly preferably 90 mol % or more.

Of the above copolymers, for example, the following copolymers (A) to (E) are suitable. Note that, $R^a$ to $R^d$ in (A) to (E) respectively refer to $R^a$ to $R^d$ in the above formula (I).

(A) A copolymer, having a structural unit wherein $R^a$ to $R^c$ are hydrogen atoms and $R^d$ is an ethyl group; a structural unit wherein $R^a$ to $R^c$ are hydrogen atoms and $R^d$ is a n-butyl group; and a structural unit wherein $R^a$ to $R^c$ are hydrogen atoms and $R^d$ is an i-butyl group (2-methylpropyl group).

(B) A copolymer, having a structural unit wherein $R^a$ to $R^c$ are hydrogen atoms, and $R^d$ is an ethyl group; and a structural unit wherein $R^a$ to $R^c$ are hydrogen atoms, and $R^d$ is a propyl group.

(C) A copolymer, having a structural unit wherein $R^a$ and $R^b$ are hydrogen atoms, and $R^c$ and $R^d$ are methyl groups; and a structural unit wherein $R^a$ to $R^c$ are hydrogen atoms, and $R^d$ is an i-octyl group (for example, 2-ethylhexyl group).

(D) A copolymer, having a structural unit wherein $R^a$ to $R^c$ are hydrogen atoms, and $R^d$ is an ethyl group; and a structural unit wherein $R^a$ and $R^b$ are hydrogen atoms, $R^c$ is a methyl group, and $R^d$ is a glycidyl group.

(E) A copolymer, having a structural unit wherein $R^a$ to $R^c$ are hydrogen atoms, and $R^d$ is an i-butyl group (2-methyl propyl group); and a structural unit wherein $R^a$ and $R^b$ are hydrogen atoms, $R^c$ is a methyl group, and $R^d$ is a methoxyethyl group.

An acrylate polymer is produced by a known method described in International Publication No. WO01/083619, for example. At this time, if the types of raw-material monomers, the type of an initiator, the ratio of structural units in a copolymer and the like are appropriately selected, the above refrigerating machine oil having desired properties can be obtained. Accordingly, a refrigerating machine oil satisfying requirements for properties such as lubricity and compatibility, which vary depending upon e.g., the compressor model in a refrigerating system or an air conditioning system, the material of the lubrication unit, refrigerating capacity and the type of a refrigerant, can be obtained as desired. The copolymer may be a block copolymer or a random copolymer.

The acrylate polymer has a weight average molecular weight (Mw) of, in view good antiwear property, 500 or more, preferably 1000 or more, more preferably 3000 or more, further preferably 3500 or more, and particularly preferably 5000 or more. The acrylate polymer has a weight average molecular weight (Mw) of, in view of good oil return performance, 100000 or less, preferably 80000 or less, more preferably 50000 or less, further preferably 30000 or less, and particularly preferably 25000 or less. The acrylate polymer has a weight average molecular weight (Mw) of, in view of particularly good antiwear property in addition to oil return performance, preferably 15000 or less, more preferably 10000 or less, further preferably 8000 or less, and particularly preferably 6000 or less.

The acrylate polymer has a weight average molecular weight (Mw) ranging from, in view of both good antiwear property and good oil return performance, preferably, 500 to 100000, 500 to 80000, 500 to 50000, 500 to 30000, 500 to 25000, 1000 to 100000, 1000 to 80000, 1000 to 50000, 1000 to 30000, 1000 to 25000, 3000 to 100000, 3000 to 80000, 3000 to 50000, 3000 to 30000, 3000 to 25000, 3000 to 15000, 3000 to 10000, 3000 to 8000, 3000 to 6000, 3500 to 100000, 3500 to 80000, 3500 to 50000, 3500 to 30000, 3500 to 25000, 3500 to 15000, 3500 to 10000, 3500 to 8000, 3500 to 6000, 5000 to 100000, 5000 to 80000, 5000 to 50000, 5000 to 30000, 5000 to 25000, 5000 to 15000, 5000 to 10000, 5000 to 8000, or 5000 to 6000.

The number average molecular weight (Mn) of the acrylate polymer may be, for example, 450 or more, 700 or more, 1500 or more, or more than 3000, and, 2000 or more, 100000 or less, 60000 or less, 40000 or less, 20000 or less, 15000 or less, 10000 or less, 6000 or less, or 4000 or less.

In the acrylate polymer, the ratio (Mw/Mn) of the weight average molecular weight (Mw) to the number average molecular weight (Mn) is, for example, 1.0 or more, 1.1 or more, 1.2 or more, 1.5 or more, or 1.6 or more, and, 3.0 or less, 2.5 or less, 2.2 or less, 2.0 or less, or 1.9 or less.

The weight average molecular weight (Mw), the number average molecular weight (Mn) and the ratio (Mw/Mn) of the weight average molecular weight (Mw) to the number average molecular weight (Mn), of the acrylate polymer refer to Mw, Mn and Mw/Mn (polystyrene (standard sample) equivalent) obtained by GPC analysis. Mw, Mn and Mw/Mn can be measured, for example, as follows.

A solution having an acrylate polymer concentration of 1 mass % is prepared by dilution using tetrahydrofuran as a solvent. The solution is analyzed using a GPC apparatus (Waters Alliance2695). Analysis is carried out using a flow rate of the solvent of 1 ml/min, a column with an analyzable molecular weight ranging from 100 to 10000 (when the molecular weight of an acrylate polymer to be analyzed is greater than 10000, a column appropriately corresponding to the molecular weight is used), and a refractive index detector. Note that, the relationship between the column retention time and the molecular weight is obtained using polystyrene with a known molecular weight as a standard, to separately prepare a calibration curve in advance. Based on the calibration curve, the molecular weight of a sample is determined from the obtained retention time.

The flash point of the acrylate polymer is preferably 195° C. or higher, 200° C. or higher or 205° C. or higher. In the present invention, the flash point refers to a value measured in accordance with KS K2265-4: 2007, "how to obtain flash point, part 4: Cleveland open cup".

The autoignition point of the acrylate polymer is preferably 335° C. or higher, 340° C. or higher, or 345° C. or higher. In the present invention, the autoignition point refers to a value measured in accordance with ASTM E659-1978.

The kinematic viscosity of the acrylate polymer is not particularly limited, as long as it has the above structure and a weight average molecular weight within the above range. The acrylate polymer may have viscosity equivalent to that of general lubricating base oil or high viscosity such that it is flowable at normal temperature. For example, the kinematic viscosity at 40° C. or 100° C. of the acrylate polymer may be 1 mm$^2$/s or more and 1,000,000 mm$^2$/s or less, preferably 10 mm$^2$/s or more and 100,000 mm$^2$/s or less, or, 100 mm$^2$/s or more or 1000 mm$^2$/s or more.

The kinematic viscosity at 40° C. of the acrylate polymer is more specifically, preferably 10 mm$^2$/s or more, more preferably 20 mm$^2$/s or more, further preferably 30 mm$^2$/s or more, and, in view of good handling and the like, preferably 1000 mm$^2$/s or less, more preferably 400 mm$^2$/s or less, further preferably 300 mm$^2$/s or less, and particularly preferably 200 mm$^2$/s or less.

The kinematic viscosity at 100° C. of the acrylate polymer is more specifically, preferably 1 mm$^2$/s or more, more preferably 2 mm$^2$/s or more, and further preferably 3 mm$^2$/s or more, and, in view of good handling and the like, preferably 200 mm$^2$/s or less, more preferably 50 mm$^2$/s or less, further preferably 40 mm$^2$/s or less, and particularly preferably 30 mm$^2$/s or less.

The acrylate polymer has a pour point of preferably −10° C. or lower, and more preferably −20° C. or lower, as well as, although its lower limit is not particularly limited, a pour point of preferably −50° C. or higher. The pour point in the present invention refers to a pour point measured in accordance with JIS K2269:1987.

The content of the acrylate polymer is not particularly limited, and in view of good oil return performance, based on the total amount of the refrigerating machine oil, is generally 0.1 mass % or more, preferably 1 mass % or more, and more preferably 5 mass % or more. In view of good oil return performance and good antiwear property, the content of the same is preferably 7 mass % or more, more preferably 10 mass % or more, further preferably 15 mass % or more, and particularly preferably 20 mass % or more. The content of the acrylate polymer is, in view of good antiwear property, based on the total amount of the refrigerating machine oil, preferably 40 mass % or less, more preferably 35 mass % or less, further preferably 30 mass % or less, and particularly preferably 25 mass % or less. The content of the acrylate polymer ranges from, in view of both good antiwear property and good oil return performance, based on the total amount of the refrigerating machine oil, preferably, 1 to 40 mass %, 1 to 35 mass %, 1 to 30 mass %, 5 to 40 mass %, 5 to 35 mass %, 5 to 30 mass %, 7 to 40 mass %, 7 to 35 mass %, 7 to 30 mass %, 7 to 25 mass %, 10 to 40 mass %, 10 to 35 mass %, 10 to 30 mass %, 10 to 25 mass %, 15 to 40 mass %, 15 to 35 mass %, 15 to 30 mass %, 15 to 25 mass %, 20 to 40 mass %, 20 to 35 mass %, 20 to 30 mass %, or 20 to 25 mass %.

The refrigerating machine oil may further contain other additives in addition to the acrylate polymer. Examples of other additives include an acid scavenger, an antioxidant, an extreme pressure agent, an oiliness agent, an antifoaming agent, a metal deactivator, an antiwear agent, a viscosity index improver, a pour-point depressant, and a detergent dispersant. The total content of these additives may be, based on the total amount of the refrigerating machine oil, preferably 10 mass % or less, more preferably 5 mass % or less, and further preferably 3 mass % or less.

The kinematic viscosity at 40° C. of the refrigerating machine oil is preferably 3 mm$^2$/s or more, more preferably 4 mm$^2$/s or more, and further preferably 5 mm$^2$/s or more. The kinematic viscosity at 40° C. of the refrigerating machine oil may be preferably 500 mm$^2$/s or less, more preferably 400 mm$^2$/s or less, and further preferably 300 mm$^2$/s or less.

The kinematic viscosity at 100° C. of the refrigerating machine oil may be preferably 1 mm$^2$/s or more, and more preferably 2 mm$^2$/s or more. The kinematic viscosity at 100° C. of the refrigerating machine oil may be preferably 100 mm$^2$/s or less, and more preferably 50 mm$^2$/s or less.

The pour point of the refrigerating machine oil may be preferably −10° C. or lower, and more preferably −20° C. or lower.

The volume resistivity of the refrigerating machine oil may be preferably $1.0 \times 10^9$ Ω·m or more, more preferably $1.0 \times 10^{10}$ Ω·m or more, and further preferably $1.0 \times 10^{11}$ Ω·m or more. Particularly when the refrigerating machine oil is used for a closed refrigerating machine, high electric insulation is preferred. The volume resistivity in the present invention refers to volume resistivity at 25° C. measured in accordance with JIS C2101:1999.

The moisture content of the refrigerating machine oil may be, based on the total amount of the refrigerating machine oil, preferably 200 ppm or less, more preferably 100 ppm or less, and further preferably 50 ppm or less. Particularly when the refrigerating machine oil is used for a closed refrigerating machine, a low moisture content is preferred in view of the effects on the thermal-chemical stability and the electric insulation of the refrigerating machine oil.

The acid value of the refrigerating machine oil may be, in view of preventing corrosion of metals used for refrigerating machines or piping, preferably 1.0 mg KOH/g or less, and more preferably 0.1 mg KOH/g or less. The acid value in the present invention refers to an acid value measured in accordance with JIS K2501:2003.

The ash content of the refrigerating machine oil may be, in view of enhancing the thermal-chemical stability of the refrigerating machine oil and suppressing the generation of sludges and the like, preferably 100 ppm or less, and more preferably 50 ppm or less. The ash content in the present invention refers to an ash content measured in accordance with JIS K2272:1998.

The refrigerating machine oil according to the embodiment is used with a refrigerant. A working fluid composition for a refrigerating machine according to the embodiment contains the refrigerating machine oil according to the embodiment and a refrigerant. Examples of such a refrigerant include a saturated fluorohydrocarbon refrigerant, an unsaturated fluorohydrocarbon refrigerant, a hydrocarbon refrigerant, a fluorine-containing ether-based refrigerant such as perfluoro ethers, a bis (trifluoro methyl)sulfide refrigerant, a trifluoride iodide methane refrigerant, and, a natural refrigerant such as ammonia and carbon dioxide.

Examples of saturated fluorohydrocarbon refrigerants include preferably $C_{1-3}$, and more preferably $C_{1-2}$ saturated fluorohydrocarbons. Specific examples thereof include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or mixtures of two or more thereof.

A saturated fluorohydrocarbon refrigerant is appropriately selected from the above examples depending on applications and required performance and preferred examples thereof include R32 alone; R23 alone; R134a alone; R125 alone; a mixture of R134a/R32=60-80 mass %/40-20 mass %; a mixture of R32/R125=40-70 mass %/60-30 mass %; a mixture of R125/R143a=40-60 mass %/60-40 mass %; a mixture of R134a/R32/R125=60 mass %/30 mass %/10 mass %; a mixture of R134a/R32/R125=40-70 mass %/15-35 mass %/5-40 mass %; and a mixture of R125/R134a/R143a=35-55 mass %/1-15 mass %/40-60 mass %. More specifically, a mixture of R134a/R32=70/30 mass %; a mixture of R32/R125=60/40 mass %; a mixture of R32/R125=50/50 mass % (R410A); a mixture of R32/R125=45/55 mass % (R410B); a mixture of R125/R143a=50/50 mass % (R507C); a mixture of R32/R125/R134a=30/10/60 mass %; a mixture of R32/R125/R134a=23/25/52 mass % (R407C); a mixture of R32/R125/R134a=25/15/60 mass % (R407E); and a mixture of R125/R134a/R143a=44/4/52 mass % (R404A) can be used, for example.

The unsaturated fluorohydrocarbon (HFO) refrigerant is preferably a $C_{2-3}$ unsaturated fluorohydrocarbon, more preferably fluoropropene, and further preferably fluoropropene having 3 to 5 fluorine atoms. The unsaturated fluorohydrocarbon refrigerant is preferably any one or a mixture of two or more selected from 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated fluorohydrocarbon refrigerant is, in view of physical properties of a refrigerant, preferably one or a mixture of two or more selected from HFO-1225ye, HFO-1234ze and HFO-1234yf. The unsaturated fluorohydrocarbon refrigerant may be fluoroethylene, or preferably 1,1,2,3-trifluoroethylene.

The hydrocarbon refrigerant is preferably a $C_{1-5}$ hydrocarbon, and more preferably a $C_{2-4}$ hydrocarbon. Specific examples of the hydrocarbon include methane, ethylene, ethane, propylene, propane (R290), cyclopropane, normal butane, isobutane, cyclobutane, methylcyclopropane, 2-methylbutane, normal pentane or a mixture of two or more thereof. Of these examples, a gaseous hydrocarbon refrigerant is preferably used at 25° C. and 1 atmosphere, and propane, normal butane, isobutane, 2-methylbutane or a mixture thereof is more preferably used.

Among the above refrigerants, the refrigerating machine oil according to the embodiment is particularly excellent in compatibility with a refrigerant selected from a mixture of difluoromethane and pentafluoroethane, difluoromethane, 2,3,3,3-tetrafluoropropene, propane and carbon dioxide, and thus is particularly suitably used with these refrigerants. Specifically, the working fluid composition for a refrigerating machine according to the embodiment contains a refrigerant that is selected from preferably a mixture of difluoromethane and pentafluoroethane, difluoromethane, 2,3,3,3-tetrafluoropropene, propane and carbon dioxide.

The refrigerating machine oil according to the embodiment is generally present in a refrigerating machine, in the form of a mixture of a working fluid composition for the refrigerating machine and a refrigerant. The content of the refrigerating machine oil in the form of the working fluid composition for a refrigerating machine ranges from preferably 1 to 500 parts by mass, and more preferably 2 to 400 parts by mass, with respect to 100 parts by mass of the refrigerant.

The refrigerating machine according to the embodiment contains the above refrigerating machine oil or working fluid composition for a refrigerating machine. Specifically, the refrigerating machine oil according to the embodiment and the working fluid composition for a refrigerating machine is suitably used for air conditioners having reciprocating or rotary hermetic compressors, refrigerators, open or closed automotive air conditioners, dehumidifiers, water heaters, freezers, refrigerating warehouse, vending machines, showcases, refrigerating machines in chemical plants or the like, and refrigerating machines having centrifugal compressors, for example.

Figure 1:
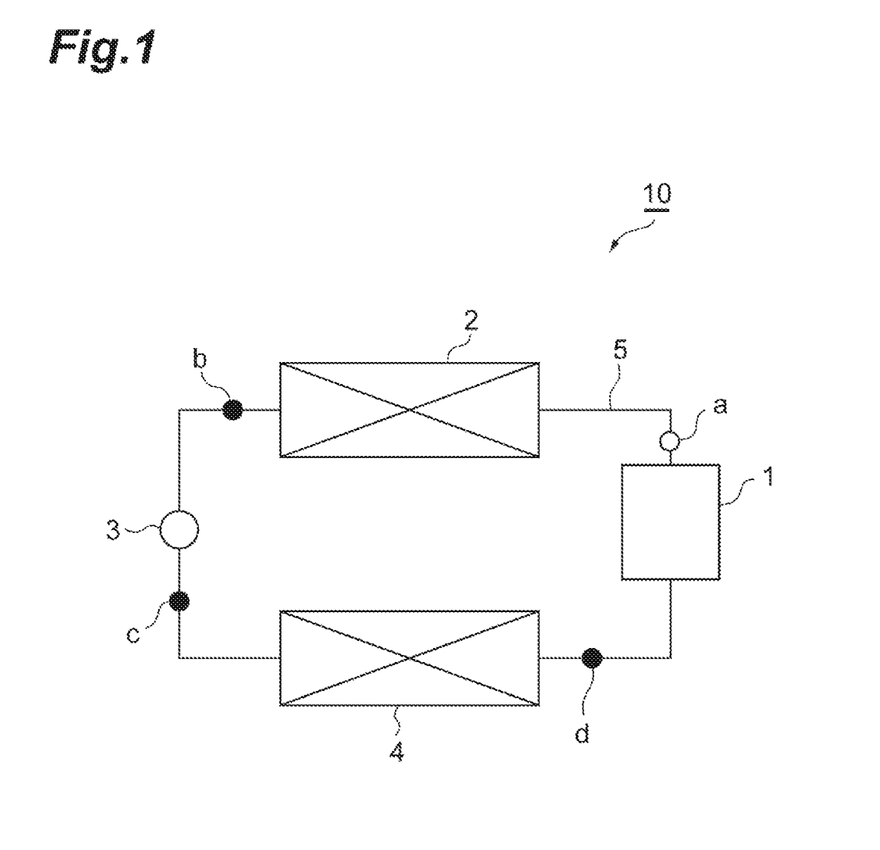
FIG. 1 is a schematic diagram showing an example of the composition of a refrigerating machine.

FIG. 1 is a schematic diagram showing an example of the configuration of the refrigerating machine according to the embodiment. As shown in FIG. 1, a refrigerating machine 10 is provided with at least a refrigerant circulation system in which a refrigerant compressor 1, a gas cooler 2, an expansion mechanism 3 (e.g., capillary and expansion valve), and an evaporator 4 are sequentially connected via a passage 5, for example. In such a refrigerant circulation system, first, a high-temperature (generally 70° C. to 120° C.) refrigerant is discharged from the refrigerant compressor 1 into the passage 5 and then compressed to a high-density fluid (e.g., supercritical fluid) in the gas cooler 2. Subsequently, the refrigerant is liquefied as it passes through a narrow passage of the expansion mechanism 3, and then vaporized in the evaporator 4 to be at a low temperature (generally, −40° C. to 0° C.).

Within the refrigerant compressor 1 in FIG. 1, under high-temperature (generally, 70° C. to 120° C.) conditions, a small amount of a refrigerant and a large amount of a refrigerating machine oil coexist. The refrigerant that is discharged from the refrigerant compressor 1 to the passage 5 is in the form of vapor containing a small amount (generally 1% to 10%) of a refrigerating machine oil in the form of mist. In this refrigerating machine oil mist, a small amount of the refrigerant is dissolved (dot "a" in FIG. 1). Next, in the gas cooler 2, the refrigerant vapor is compressed to a high-density fluid, in which a large amount of the refrigerant and a small amount of the refrigerating machine oil coexist under relatively high-temperature (generally around 50° C. to 70° C.) conditions (dot "b" in FIG. 1). Furthermore, a mixture of a large amount of the refrigerant and a small amount of the refrigerating machine oil is sent sequentially to the expansion mechanism 3, and then to the evaporator 4, so that the temperature (generally −40° C. to 0° C.) thereof is rapidly lowered (dots "c" and "d" in FIG. 1) and then the resultant is sent back to the refrigerant compressor 1.

EXAMPLES

Hereinafter, the present invention is more specifically described on the basis of Examples, but the invention is not limited to the following Examples.

The following base oils and additives were used.
(Base Oil)
A1: polyol ester (40° C. kinematic viscosity: 56 mm$^2$/s, 100° C. kinematic viscosity: 7.1 mm$^2$/s, viscosity index: 81) of pentaerythritol and 2-methylpropanoic acid/3,5,5-trimethylhexanoic acid (molar ratio: 50/50)
A2: polyol ester (40° C. kinematic viscosity: 68 mm$^2$/s, 100° C. kinematic viscosity: 8.3 mm$^2$/s, viscosity index: 88) of pentaerythritol and 2-ethylhexanoic acid/3,5,5-trimethylhexanoic acid (molar ratio: 50/50)
A3: ethyl vinyl ether polymer (number average molecular weight (Mn): 1900, the ratio (Mw/Mn) of the weight average molecular weight (Mw) to the number average molecular weight (Mn): 1.29, 40° C. kinematic viscosity: 71 mm$^2$/s, 100° C. kinematic viscosity: 8.6 mm$^2$/s, viscosity index: 89)
A4: polypropyleneglycol dimethyl ether (number average molecular weight (Mn): 1000, 40° C. kinematic viscosity: 46.0 mm$^2$/s, viscosity index: 190, pour point: −45° C., flash point: 218° C.)

(Additive)
B1-B7: acrylate polymers shown in Table 1
Abbreviations in Table 1 represent the following additives:
AC2: ethyl acrylate
AnC4: butyl acrylate
AEtOM: ethoxymethyl acrylate
MAC1: methyl methacrylate
MAnC4: butyl methacrylate
MAnC6: hexyl methacrylate
MAiC8: 2-ethylhexyl methacrylate
MAnC18: stearyl methacrylate
MAnC20: eicocyl methacrylate

TABLE 1

|  | B1 | B2 | B3 | B4 | B5 | B6 | B7 |
| --- | --- | --- | --- | --- | --- | --- | --- |
| Mw | 3060 | 1800 | 20000 | 5300 | 260 | 100100 | 5500 |
| Mn | 1750 | 1000 | 12300 | 2900 | 140 | 63500 | 3450 |
| Mw/Mn | 1.74 | 1.80 | 1.62 | 1.83 | 1.86 | 1.59 | 1.59 |
| Type of monomer | AC2/AnC4 | AEtOM | MAC1/MAnC4/MAnC18 | MAC1/MAiC8 | MAC1 | MAC1/MAnC4/MAnC6 | MAnC20 |
| Molar ratio of monomers | 70/30 | 100 | 60/32/8 | 85/15 | 100 | 80/15/5 | 100 |

The aforementioned base oils and additives were mixed as shown in Tables 2 to 4, and thus refrigerating machine oils were prepared. Each refrigerating machine oil was subjected to an antiwear property test and an oil return performance test. The test results are shown in Tables 2 to 4.

(Antiwear Property Test)
The antiwear property test was conducted using a hyperbaric-atmosphere friction tester (system of rotation sliding of a rotating vane material and a fixed disk material) manufactured by SHINKO ENGINEERING CO., LTD., in the same atmosphere of a refrigerant as created by a practical compressor. Any one of R410A, R32, HFO-1234yf, CO$_2$ and R290 was used as a refrigerant to be evaluated, SKH-51 was used as a vane material, and FC250 was used as a disk material. The test was conducted under conditions of the amount of a test oil of 600 mL, the test temperature of 90° C., the test vessel pressure of 1.6 MPa, the number of revolutions of 550 rpm, a load of 90 kgf, and the test time of 1 hour.

In addition, the test for R290 was conducted using n-hexane as an alternative refrigerant in view of safety, such that the content of n-hexane to be mixed in the refrigerating machine oil is 20% by volume. The test was conducted under the same conditions as those for other refrigerants above except that the test vessel pressure is controlled to be slightly higher than atmospheric pressure.

Antiwear property was evaluated based on the wear depth (μm) of the vane material since the amount of wear of the disk material was extremely low. It can be said that the lower the wear depth of the vane material (for example, 12 μm or less when R410A was used, 13 μm or less and preferably 10.3 μm or less when R32 was used, 15 μm or less when HFO-1234yf was used, 16 μm or less when R290 was used, and 17 μm or less when CO$_2$ was used), the better the antiwear property.

Figure 2:
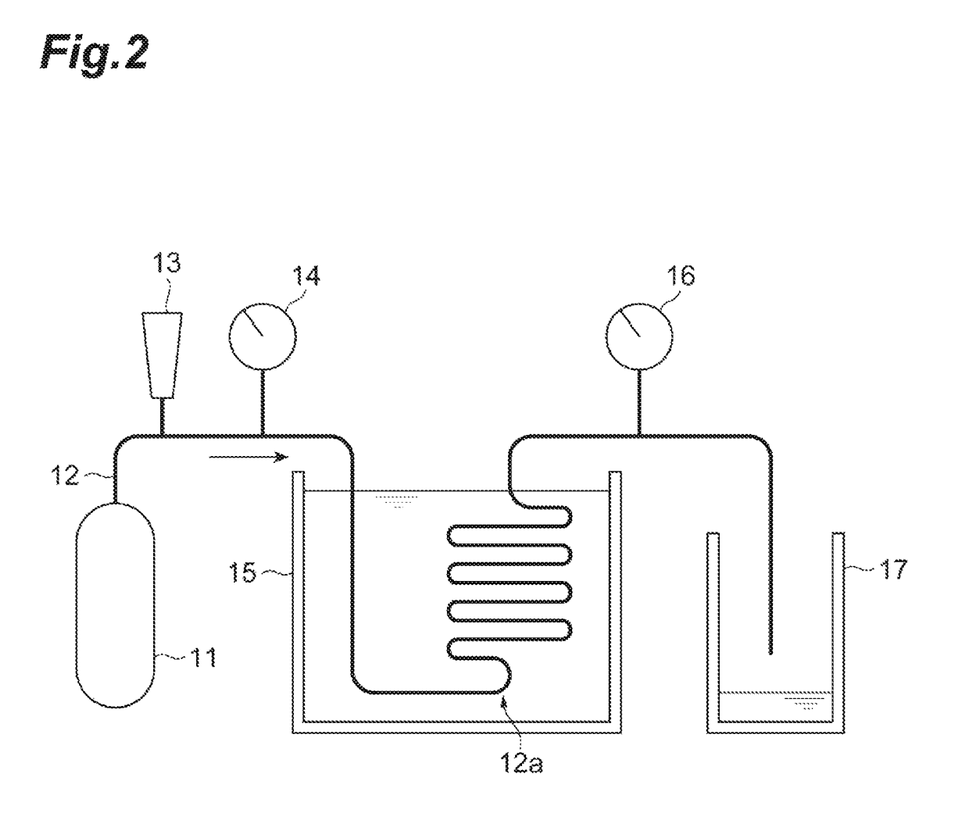
FIG. 2 is a schematic diagram showing an apparatus used in an oil return performance test in the examples.

(Oil Return Performance Test)
An apparatus shown in FIG. 2 was used. A refrigerant tank 11 was filled with a R410A refrigerant, and then a portion 12a of copper piping 12 having a length of 1.5 m and an inside diameter of 0.0036 m immersed in a thermostat bath 15 was filled with 5.0 g of a refrigerating machine oil. The temperature of the thermostat bath 15 was set at −20° C., and then the refrigerant was run through the copper piping 12 at a flow rate of 0.001 m³ per minute from the refrigerant tank 11 to an oil receiver 17. At this time, the flow rate of the refrigerant was monitored with a flowmeter 13, pressure within the copper piping 12 between the refrigerant tank 11 and the thermostat bath 15 was monitored with a pressure gage 14, and pressure within the copper piping 12 between the thermostat bath 15 and the oil receiver 17 was monitored with a pressure gage 16. At 30 minutes after the start of flowing the refrigerant, the mass of the refrigerating machine oil accumulated in the oil receiver 17 was measured, and then the oil return rate was calculated according to the following formula. It can be said that the higher the oil return rate (for example, 40 mass % or more), the better the oil return performance.

Oil return rate (mass %)=(mass of refrigerating machine oil accumulated in oil receiver (g)/5.0 (g))×100

TABLE 2

| | | Example 1 | Example 2 | Example 3 | Example 4 | Example 5 |
|---|---|---|---|---|---|---|
| Composition (mass %) | A1 | 80 | — | — | — | — |
| | A2 | — | 80 | — | 70 | 60 |
| | A3 | — | — | 80 | — | — |
| | B1 | 20 | 20 | 20 | 30 | 40 |
| Antiwear property (μm) | | | | | | |
| Refrigerant evaluated | R410A | 8.9 | 6.3 | 7.1 | 7.9 | 9.0 |
| | R32 | 10.3 | 8.4 | 7.9 | 8.9 | 9.9 |
| | HFO-1234yf | 13.9 | 12.7 | 8.8 | 13.4 | 14.8 |
| | R290 | 13.1 | 11.9 | 9.7 | 12.7 | 14.4 |
| | CO₂ | 14.1 | 13.8 | 16.8 | 14.4 | 14.8 |
| Oil return performance (mass %) | | 68 | 51 | 57 | 58 | 62 |

TABLE 3

| | | Example 6 | Example 7 | Example 8 | Example 9 | Example 10 | Example 11 |
|---|---|---|---|---|---|---|---|
| Composition (mass %) | A1 | — | — | — | — | 40 | 40 |
| | A2 | 90 | 80 | 80 | 80 | 40 | 40 |
| | A3 | — | — | — | — | — | — |
| | B1 | 10 | — | — | — | — | — |
| | B2 | — | 20 | — | — | 20 | 10 |
| | B3 | — | — | 20 | — | — | 10 |
| | B4 | — | — | — | 20 | — | — |
| Antiwear property (μm) | | | | | | | |
| Refrigerant evaluated | R410A | 6.0 | 5.0 | 7.3 | 5.8 | 6.5 | 7.0 |
| | R32 | 7.0 | 6.1 | 9.2 | 6.4 | 8.5 | 8.3 |
| | HFO-1234yf | 11.9 | 8.3 | 10.3 | 8.5 | 8.9 | 10.0 |
| | R290 | 10.2 | 8.9 | 12.2 | 9.2 | 9.2 | 11.9 |
| | CO₂ | 13.1 | 9.9 | 13.4 | 9.3 | 10.8 | 14.2 |
| Oil return performance (mass %) | | 53 | 61 | 48 | 55 | 58 | 55 |

TABLE 4

| | | Comparative example 1 | Comparative example 2 | Comparative example 3 | Comparative example 4 |
|---|---|---|---|---|---|
| Composition (mass %) | A1 | — | 80 | — | — |
| | A2 | 80 | — | 80 | 50 |
| | B1 | — | — | — | 50 |
| | B5 | 20 | — | — | — |
| | B6 | — | 20 | — | — |
| | B7 | — | — | 20 | — |

TABLE 4-continued

| | | Comparative example 1 | Comparative example 2 | Comparative example 3 | Comparative example 4 |
|---|---|---|---|---|---|
| Antiwear property (μm) | | | | | |
| Refrigerant evaluated | R410A | 17.1 | 4.3 | 3.1 | 13.4 |
| | R32 | 15.3 | 5.1 | 4.5 | 10.4 |
| | HFO-1234yf | 17.7 | 6.6 | 6.3 | 20.5 |
| | R290 | 18.2 | 6.9 | 6.6 | 19.5 |
| | CO₂ | 20.3 | 12.2 | 8.7 | 18.4 |
| Oil return performance (mass %) | | 60 | 28 | 22 | 74 |

REFERENCE SIGNS LIST

1 . . . refrigerant compressor, 2 . . . gas cooler, 3 . . . expansion mechanism, 4 . . . evaporator, 5 . . . passage, 10 . . . refrigerating machine, 11 . . . refrigerant tank, 12 . . . copper piping, 13 . . . flowmeter, 14, 16 . . . pressure gage, 15 . . . thermostat bath, 17 . . . oil receiver.

The invention claimed is:

1. A refrigerating machine oil comprising:
   a lubricating base oil consisting of at least one oxygen-containing oil selected from an ester and an ether; and
   1 to 40 mass % of a polymer, based on a total amount of the refrigerating machine oil, the polymer having a structural unit represented by the following formula (I) and a weight average molecular weight of from 500 to 100000;

wherein in formula (I), $R^a$, $R^b$ and $R^c$ each independently represents a hydrogen atom or a hydrocarbon group, and $R^d$ represents an oxygen-containing organic group or a $C_{1-18}$ hydrocarbon group.

2. The refrigerating machine oil according to claim 1, wherein the ester comprises an ester of polyhydric alcohol and carboxylic acid.

3. The refrigerating machine oil according to claim 1, wherein the refrigerating machine oil is used together with at least one refrigerant selected from a saturated fluorohydrocarbon refrigerant, an unsaturated fluorohydrocarbon refrigerant, a hydrocarbon refrigerant and a natural refrigerant.

4. A refrigerating machine, comprising the refrigerating machine oil according to claim 1.

5. A working fluid composition for a refrigerating machine, comprising:
a refrigerant; and
the refrigerating machine oil according to claim 1.

6. The working fluid composition for a refrigerating machine according to claim 5, wherein the refrigerant is at least one refrigerant selected from a saturated fluorohydrocarbon refrigerant, an unsaturated fluorohydrocarbon refrigerant, a hydrocarbon refrigerant and a natural refrigerant.

7. A refrigerating machine, comprising the working fluid composition for a refrigerating machine according to claim 5.

* * * * *